(12) United States Patent
Ukon et al.

(10) Patent No.: US 10,891,246 B2
(45) Date of Patent: Jan. 12, 2021

(54) DATA PROCESSING APPARATUS, NETWORK SYSTEM, PACKET ORDER CONTROL CIRCUIT, AND DATA PROCESSING METHOD

(71) Applicant: NIPPON TELEGRAPH AND TELEPHONE CORPORATION, Tokyo (JP)

(72) Inventors: Yuta Ukon, Tokyo (JP); Syuhei Yoshida, Tokyo (JP); Koji Yamazaki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/490,393

(22) PCT Filed: Feb. 28, 2018

(86) PCT No.: PCT/JP2018/007501
§ 371 (c)(1),
(2) Date: Aug. 30, 2019

(87) PCT Pub. No.: WO2018/159677
PCT Pub. Date: Sep. 7, 2018

(65) Prior Publication Data
US 2020/0192833 A1    Jun. 18, 2020

(30) Foreign Application Priority Data

Mar. 1, 2017  (JP) .................................. 2017-038051

(51) Int. Cl.
*G06F 13/16*        (2006.01)
*G06F 9/445*        (2018.01)
(Continued)

(52) U.S. Cl.
CPC ...... *G06F 13/1673* (2013.01); *G06F 9/44505* (2013.01); *G06F 13/128* (2013.01); *G06F 13/38* (2013.01); *H04L 29/10* (2013.01)

(58) Field of Classification Search
CPC .............. G06F 13/128; G06F 13/1673; G06F 9/44505; H04L 29/10
See application file for complete search history.

(56) References Cited

U.S. PATENT DOCUMENTS 6,289,023 B1 * 9/2001 Dowling ............... H04L 1/0057
370/419
8,903,966 B2 * 12/2014 Bender ................... G06F 8/654
709/221
(Continued)

FOREIGN PATENT DOCUMENTS

JP    2003-023462 A    1/2003
JP    2016-046736 A    4/2016

OTHER PUBLICATIONS

DPDK, "Docs, Programmer's Guide, 15. Reorder Library", Intel Corporation, 2015, 2 pages.
(Continued)

*Primary Examiner* — Glenn A. Auve
(74) *Attorney, Agent, or Firm* — Womble Bond Dickinson (US) LLP (57) ABSTRACT

A buffer (32) for temporarily storing a packet is installed in a packet order control circuit (12H). A comparison circuit (31) compares the packet ID of an input packet with a next-selection ID indicating the packet ID of a packet to be selected next in accordance with an order. If the comparison result indicates that the packet ID and the next-selection ID do not match, a control circuit (36) stores the input packet
(Continued)

in a storage position corresponding to the packet ID. If the packet ID and the next-selection ID match, the control circuit (36) selects the input packet as a target of a transfer process without storing the packet in the buffer (32). If the next-selection ID matches the packet ID of a packet stored in the buffer (32), the control circuit (36) selects the packet as a target of the transfer process. This guarantees the packet processing order with few memory resources.

16 Claims, 10 Drawing Sheets

(51) Int. Cl.
    *G06F 13/12*     (2006.01)
    *H04L 29/10*     (2006.01)
    *G06F 13/38*     (2006.01)

(56) References Cited

U.S. PATENT DOCUMENTS

2011/0123127 A1*   5/2011   Mima ................... H04N 19/46
                                                         382/239
2013/0086295 A1*   4/2013   Hidaka .................. H04L 49/35
                                                         710/313

OTHER PUBLICATIONS

International Preliminary Report on Patentability received for PCT Patent Application No. PCT/JP2018/007501, dated Sep. 12, 2019, 10 pages (6 pages of English Translation and 4 pages of Original Document).
International Search Report and Written Opinion received for PCT Patent Application No. PCT/JP2018/007501, dated Apr. 10, 2018, 10 pages (5 pages of English Translation and 5 pages of Original Document).

* cited by examiner

DATA PROCESSING APPARATUS, NETWORK SYSTEM, PACKET ORDER CONTROL CIRCUIT, AND DATA PROCESSING METHOD

TECHNICAL FIELD

The present invention relates to a packet order control technique to be used when providing network services by causing a plurality of data processing apparatuses to cooperate with each other.

BACKGROUND ART

Conventionally, functions of network services to be provided for users are configured by dedicated hardware such as a router and a gateway. Recently, however, attention is focused on an NFV (Network Functions Virtualization) technique of causing these functions to operate as software on a versatile server in order to reduce the installation cost.

As a system for flexibly providing network services by freely combining a plurality of NFV applications distributed on a network, an SFC (Service Function Chaining) technique that transfers service data by packets in an appropriate order corresponding to functions included in the network services is being studied (see, for example, patent literature 1).

Generally, a system using the SFC technique includes a data processing function (SF: Service Function) of performing service processing based on an arbitrary algorithm, a packet transfer function (SFF: Service Function Forwarder) of transferring a packet containing service data based on header information, and a control function of controlling the whole network system.

The SFC technique has been developed to virtualize functions mainly pertaining to network services and make flexible service operations possible. However, it is probably possible to expect similar effects even by applying the SFC technique to functions other than the network functions. An example is to virtualize an image processing function and classify images on a network. Originally, the user must obtain all target images and classify images containing a target object after that. However, the user can receive only necessary images by classifying images on a network, thereby reducing processing on his or her terminal.

RELATED ART LITERATURE

Patent Literature

Patent Literature 1: Japanese Patent Laid-Open No. 2016-46736

Non-Patent Literature

Non-Patent Literature 1: "DPDK Programmer's Guide 15. Reorder Library", [online], 2015, Intel Corporation, [searched 21/12/2016], Internet <URL:http://dpdk.org/doc/guides/prog_guide/reorder_lib.h tml>

DISCLOSURE OF INVENTION

Problem to be Solved by the Invention

The image processing function as described above generally requires a large calculation amount and hence is unsuitable for software processing, so it is desirable to perform calculations by using hardware such as an ASIC (Application Specific Integrated Circuit), a GPU (Graphics Processing Unit), or an FPGA (Field-Programmable Gate Array). Therefore, a network apparatus for performing data processing must have a hardware processing function in addition to a software processing function.

Also, packet communication is generally used when exchanging data on a network. In packet communication, data is divided into packets as small units and individually transmitted. Since the processing order of packets may change due to various factors, the receiving side must assemble correct data by changing the packet order.

In an OSI (Open Systems Interconnection) reference model, an IP (Internet Protocol) is a main protocol in a network layer, and a TCP (Transmission Control Protocol) is a protocol in a transport layer. In communication using this TCP, the packet processing order can be guaranteed in the transport layer. However, the TCP is generally a communication protocol requiring complicated processing and hence is unsuitable for an application for which a delay is fatal.

For an application as described above, communication using a UDP (User Datagram Protocol) as another protocol in the transport layer is sometimes performed. However, the UDP cannot guarantee the packet processing order, so the application layer must guarantee the correctness of data.

Accordingly, a packet order control mechanism coupled with an application is necessary when performing data processing that receives UDP packets on hardware.

Conventionally, a reorder library is provided in a DPDK (Data Plane Development Kit), as a system for controlling the packet processing order (see, for example, non-patent literature 1). This DPDK is a software library group specialized to network processing, and can implement very-high-speed network processing.

More specifically, the reorder library operates as follows. First, input packets are stored in an order buffer in accordance with the sequence numbers. Then, the contents of the order buffer are moved to a free area of a ready buffer. After that, an application extracts the packets from the ready buffer.

The reorder library of the DPDK as described above can guarantee the packet processing order, but the configuration requires two buffers, that is, the order buffer and the ready buffer. Therefore, the reorder library has the problems that it is not suitable for hardware implementation for which memory resources are strictly restricted, and cannot guarantee the packet processing order with few memory resources.

The present invention solves this problem, and has as its object to provide a packet order control technique capable of guaranteeing the packet processing order with few memory resources.

Means of Solution to the Problem

To achieve this object, a data processing apparatus according to the present invention includes one or a plurality of input/output circuits configured to perform data communication via a communication link, and a hardware processing unit configured to implement, by hardware, data processing for configuring a network service to be used by a user, wherein the hardware processing unit includes a data processing circuit configured to execute the data processing based on input data, a packet transfer circuit configured to receive a packet containing data for executing the data processing, and transmit a packet containing data obtained by the data processing, and a packet order control circuit configured to sequentially select packets received and input by the packet transfer circuit, in accordance with an order of packet IDs contained in header information of the packets, and perform a transfer process of transferring data contained in the selected packets to the data processing circuit, the packet order control circuit includes a buffer configured to temporarily store a packet, a comparison circuit configured to compare a packet ID of an input packet with a next-selection ID indicating a packet ID of a packet to be selected next in accordance with the order, and a control circuit configured to store the input packet in a storage position of the buffer, which corresponds to the packet ID, if a comparison result of the comparison circuit indicates that the packet ID and the next-selection ID do not match, and select the input packet as a target of the transfer process without storing the packet in the buffer, if the packet ID and the next-selection ID match, and, if the next-selection ID matches a packet ID of a packet stored in the buffer, the control circuit selects the packet as a target of the transfer process.

A network system according to the present invention includes a plurality of data processing apparatuses distributed on a network, and provides various network services for a user by cooperation of the data processing apparatuses, wherein at least one or a plurality of data processing apparatuses include the abovementioned data processing apparatus that implements data processing for configuring the network services by hardware.

A packet order control circuit according to the present invention includes a buffer configured to temporarily store a packet to be subjected to preset processing, a comparison circuit configured to compare a packet ID contained in an input packet with a next-selection ID indicating a packet ID of a packet to be selected next in accordance with an order of packet IDs, and a control circuit configured to store the input packet in a storage position of the buffer, which corresponds to the packet ID, if a comparison result of the comparison circuit indicates that the packet ID and the next-selection ID do not match, and select the input packet as a target of the processing without storing the packet in the buffer, if the packet ID and the next-selection ID match, wherein if the next-selection ID matches a packet ID of a packet stored in the buffer, the control circuit selects the packet as a target of the processing.

A data processing method according to the present invention is a data processing method to be used in a data processing apparatus including one or a plurality of input/output circuits configured to perform data communication via a communication link, and a hardware processing unit configured to implement, by hardware, data processing for configuring a network service to be used by a user, and includes a data processing step of causing a data processing circuit to execute the data processing based on input data, a packet transfer step of causing a packet transfer circuit to receive a packet containing data for executing the data processing, and transmit a packet containing data obtained by the data processing, and a packet order control step of causing a packet order control circuit to sequentially select packets received and input by the packet transfer circuit, in accordance with an order of packet IDs contained in header information of the packets, and perform a transfer process of transferring data contained in the selected packets to the data processing circuit, wherein the packet order control step includes a comparison step of causing a comparison circuit to compare a packet ID of an input packet with a next-selection ID indicating a packet ID of a packet to be selected next in accordance with the order, and a control step of causing a control circuit to store the input packet in a storage position of the buffer, which corresponds to the packet ID, if a comparison result of the comparison circuit indicates that the packet ID and the next-selection ID do not match, and select the input packet as a target of the transfer process without storing the packet in the buffer, if the packet ID and the next-selection ID match, and, if the next-selection ID matches a packet ID of a packet stored in the buffer, the control step selects the packet as a target of the transfer process.

Effect of the Invention

According to the present invention, whether to select a packet input to the packet order control circuit a transfer target to the data processing circuit in accordance with the packet ID order or temporarily store the packet in the buffer is accurately determined based on the packet ID and the next-selection ID. Therefore, when a packet is selected as a transfer target, the packet can be transferred to the data processing unit without being stored in the buffer. Also, the storage location of a packet stored in the buffer can uniquely be specified based on the packet ID. Accordingly, a packet corresponding to the next-selection ID can immediately be selected from the buffer.

By installing only one buffer, therefore, sequentially input packets can sequentially be selected in accordance with the order of packet IDs contained in header information of these packets. This makes it possible to guarantee the packet processing order with minimum memory resources even in hardware implementation for which memory resources are strictly restricted. Consequently, even a network service requiring data processing having a large calculation amount and unsuitable for software processing can be implemented by hardware implementation for which memory resources are strictly restricted.

BEST MODE FOR CARRYING OUT THE INVENTION

An embodiment of the present invention will be explained below with reference to the accompanying drawings.

[Network System]

First, a network system 1 according to this embodiment will be explained with reference to FIG. 1.

Figure 1:
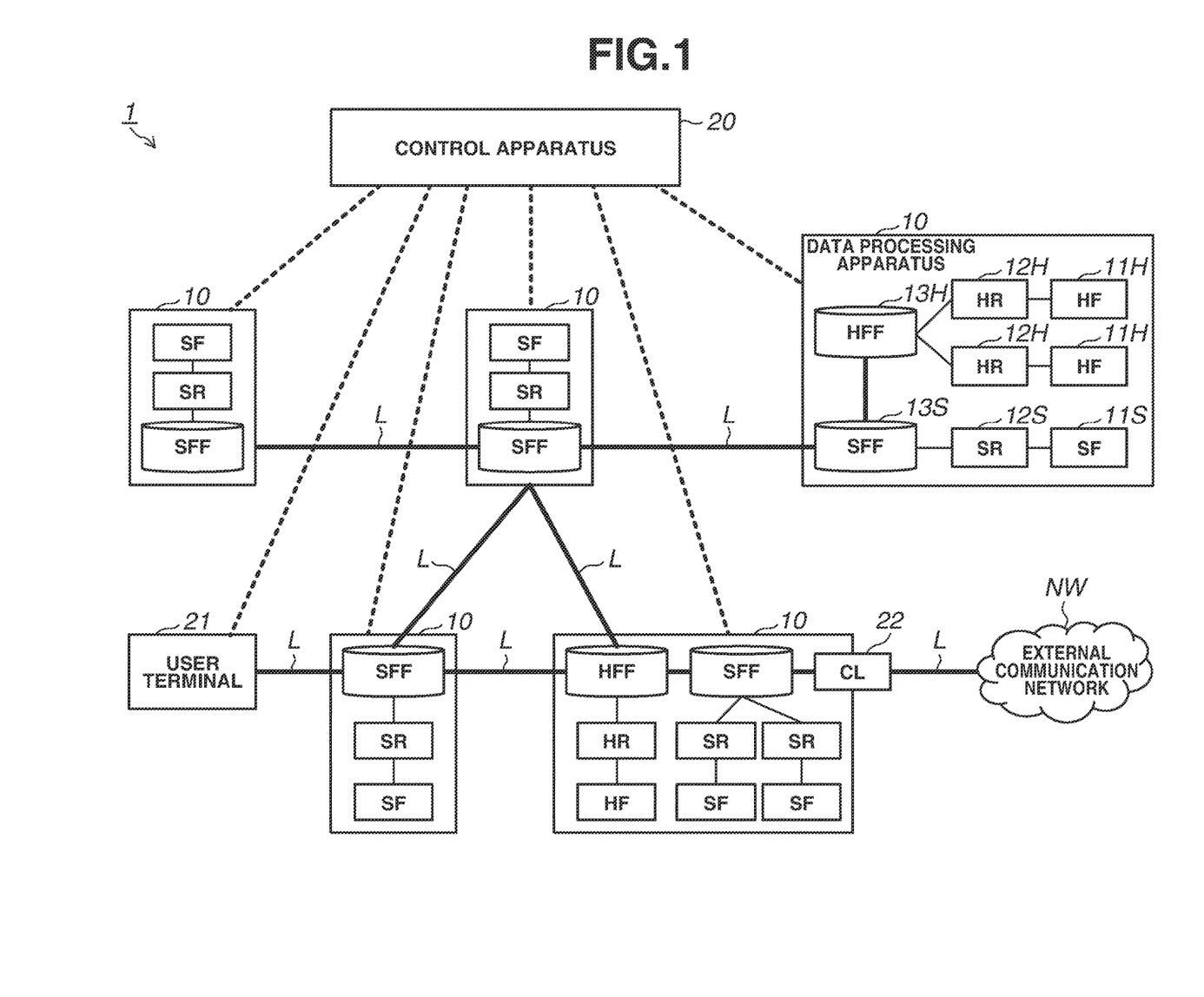
FIG. 1 is a block diagram showing the configuration of a network system.

As shown in FIG. 1, the network system 1 has a function of providing various network services for users by causing a plurality of data processing functions distributed on a network to cooperate with each other, based on the SFC (Service Function Chaining) technique. Note that the network services in the present invention not only provide network functions but also include host applications operating on a network, such as image processing and moving image processing.

The network system 1 includes a plurality of data processing apparatuses 10 that are connected to each other via communication links L and execute data processing for configuring network services to be used by users, an SFC header information giving apparatus 22 for giving SFC header information to a packet, and a control apparatus 20 that controls the data processing apparatuses 10 so as to cooperate with each other in a predetermined order based on a service pattern indicating the cooperation of the data processing for configuring the network services, thereby providing the network services for the users.

As main functional units, the data processing apparatus 10 includes a data processing unit (SF) 11S for executing the data processing for configuring the network services to be used by the users, a packet order control unit (SR) 12S for changing the processing order based on header information of each packet, a packet transfer unit (SFF) 13S for transferring service data to be processed by the data processing unit 11S, a data processing circuit (HF) 11H for executing the data processing for configuring the network services to be used by the users, a packet order control circuit (HR) 12H for changing the processing order based on header information of each packet, and a packet transfer circuit (HFF) 13H for transferring service data to be processed by the data processing circuit 11H.

In the network system 1, the SFC header information giving apparatus 22 gives SFC header information to a packet from an external communication network NW. In the network system 1, the packet transfer unit 13S or the packet transfer circuit 13H of the data processing apparatus 10 performs routing based on this SFC header information.

Consequently, the packet transfer unit 13S transfers a packet to the data processing unit 11S or the packet transfer unit 13S of the same apparatus via the packet order control unit 12S, or to another data processing apparatus 10. Also, the packet transfer circuit 13H transfers a packet to the data processing circuit 11H or the packet transfer circuit 13H of the same apparatus via the packet order control circuit 12H, or to another data processing apparatus 10.

In this process, the packet is calculated in one or more data processing units 11S or data processing circuits 11H, and transmitted to a user terminal 21. In this configuration, the processing required by the user is performed on the network, so processing on the user terminal 21 reduces.

[Data Processing Apparatus]

The data processing apparatus 10 according to this embodiment will be explained below with reference to FIG. 2.

Figure 2:
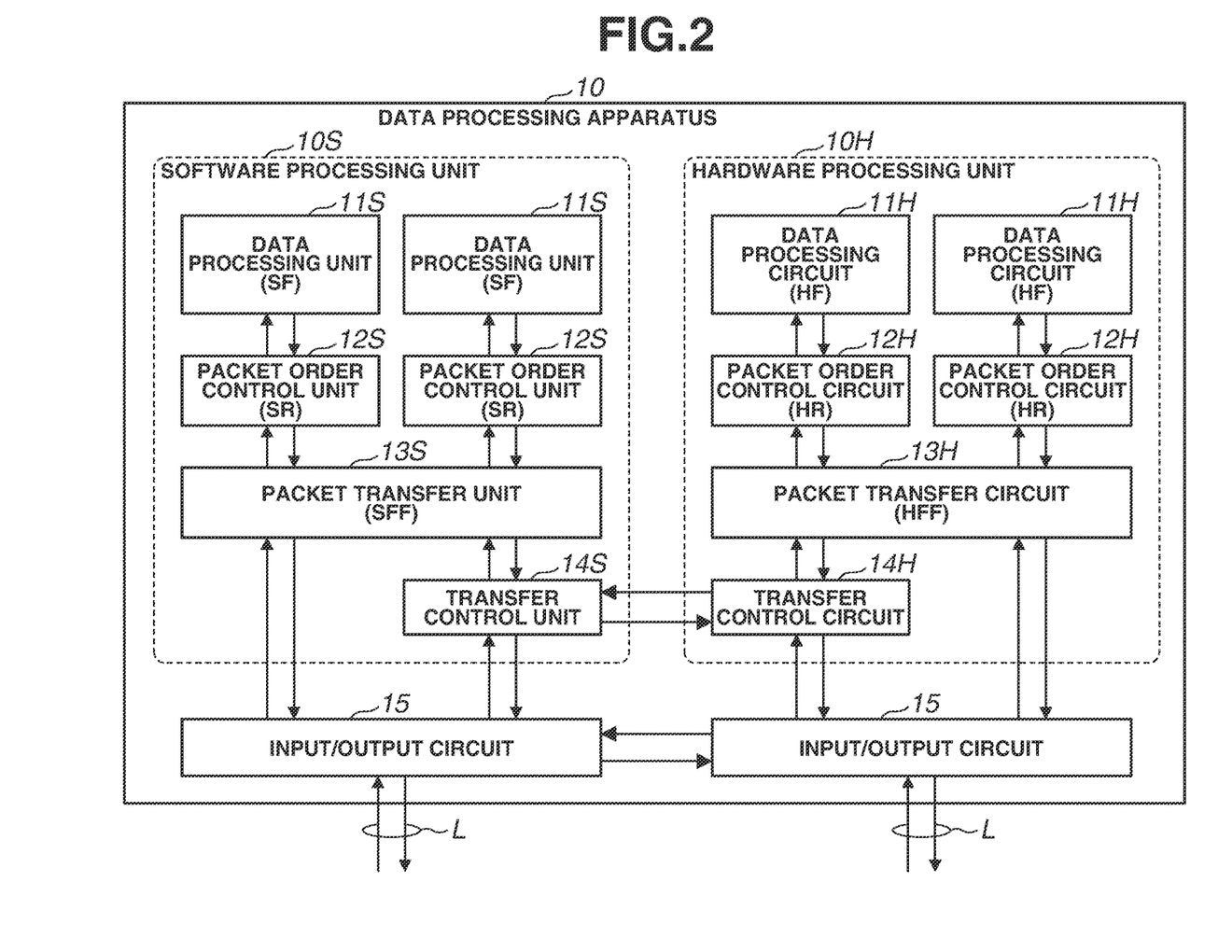
FIG. 2 is a block diagram showing the arrangement of a data processing apparatus.

As shown in FIG. 2, the data processing apparatus 10 includes a software processing unit 10S so configured as to implement data processing for configuring a network service to be used by the user by mainly the cooperation of a CPU (hardware) and a program (software), a hardware processing unit 10H so configured as to implement data processing for configuring a network service to be used by the user by mainly hardware, and one or a plurality of input/output circuits 15 that perform data communication via communication links L. For example, the data processing apparatus 10 is implemented by combining a versatile server and an FPGA (Field-Programmable Gate Array).

As main functional units, the software processing unit 10S includes one or a plurality of data processing units (SF) 11S for collectively performing data processing on one or more packets containing service data, a packet transfer unit (SFF) 13S for transferring a packet received from outside the apparatus via the input/output circuit 15 to the data processing unit 11S or another data processing apparatus 10, a packet order control unit (SR) 12S for changing the processing order based on header information of each packed to be exchanged between the corresponding data processing unit 11S and the packet transfer unit 13S, and a transfer control unit 14S for obtaining packet transfer destination information from outside the apparatus via the input/output circuit 15.

As main functional units, the hardware processing unit 10H includes one or a plurality of data processing circuits (HF) 11H for collectively performing data processing on one or more packets containing service data, a packet transfer circuit (HFF) 13H for transferring a packet received from outside the apparatus via the input/output circuit 15 to the data processing circuit 11H or another data processing apparatus 10, a packet order control circuit (HR) 12H that, when transferring data of packets input from the packet transfer circuit 13H to the corresponding data processing circuit 11H, sequentially selects and transfers the data in accordance with the order of packet IDs contained in header information of these packets, and a transfer control circuit 14H for obtaining packet transfer information from outside the apparatus via the input/output circuit 15.

In the configuration example shown in FIG. 2, the two data processing units 11S are formed in the software processing unit 10S, and the two data processing circuits 11H are formed in the hardware processing unit 10H. However, the numbers of the data processing units 11S and the data processing circuits 11H are not limited to this.

Also, the transfer control unit 14S and the transfer control circuit 14H have a function of exchanging packet transfer destination information. In addition, the input/output circuit 15 has a function of exchanging packets.

A packet received by the input/output circuit 15 is transferred to the corresponding one of the packet transfer unit 13S and the packet transfer circuit 13H. In the software processing unit 10S, the packet transfer unit 13S transfers the input packet to the input/output circuit 15, the packet order control unit 12S, or the packet transfer circuit 13H based on SFC header information of the input packet. The transfer control unit 14S manages transfer destination information of the packet. In the hardware processing unit 10H, the packet transfer circuit 13H transfers the input packet to the input/output circuit 15, the packet order control circuit 12H, or the packet transfer circuit 13S based on SFC header information of the input packet. The transfer control circuit 14H manages transfer destination information of the packet.

When the software processing unit 10S performs data processing by using the packet, the packet is transferred from the packet transfer unit 13S to the data processing unit 11S via the packet order control unit 12S. In this processing, the packet order control unit 12S controls the packet processing order, and parses the packet. Data calculated by the data processing unit 11S is shaped into a packet by the packet order control unit 12S, and transferred to the packet transfer unit 13S.

When the hardware processing unit 10H performs data processing by using the packet, the packet is transferred from the packet transfer circuit 13H to the data processing circuit 11H via the packet order control circuit 12H. In this processing, the packet order control circuit 12H controls the packet processing order, and parses the packet. Data calculated by the data processing circuit 11H is shaped into a packet by the packet order control circuit 12H, and transferred to the packet transfer circuit 13H.

The packet having undergone the necessary processing in the data processing apparatus 10 is transferred to another data processing apparatus 10 via the input/output circuit 15. By repeating this in each data processing apparatus 10, processes required by the user are executed in order, and the final calculation result is sent to the user terminal 21.

[Packet Order Control Circuit]

The packet order control circuit 12H according to this embodiment will be explained below with reference to FIG. 3A.

Figure 3A:
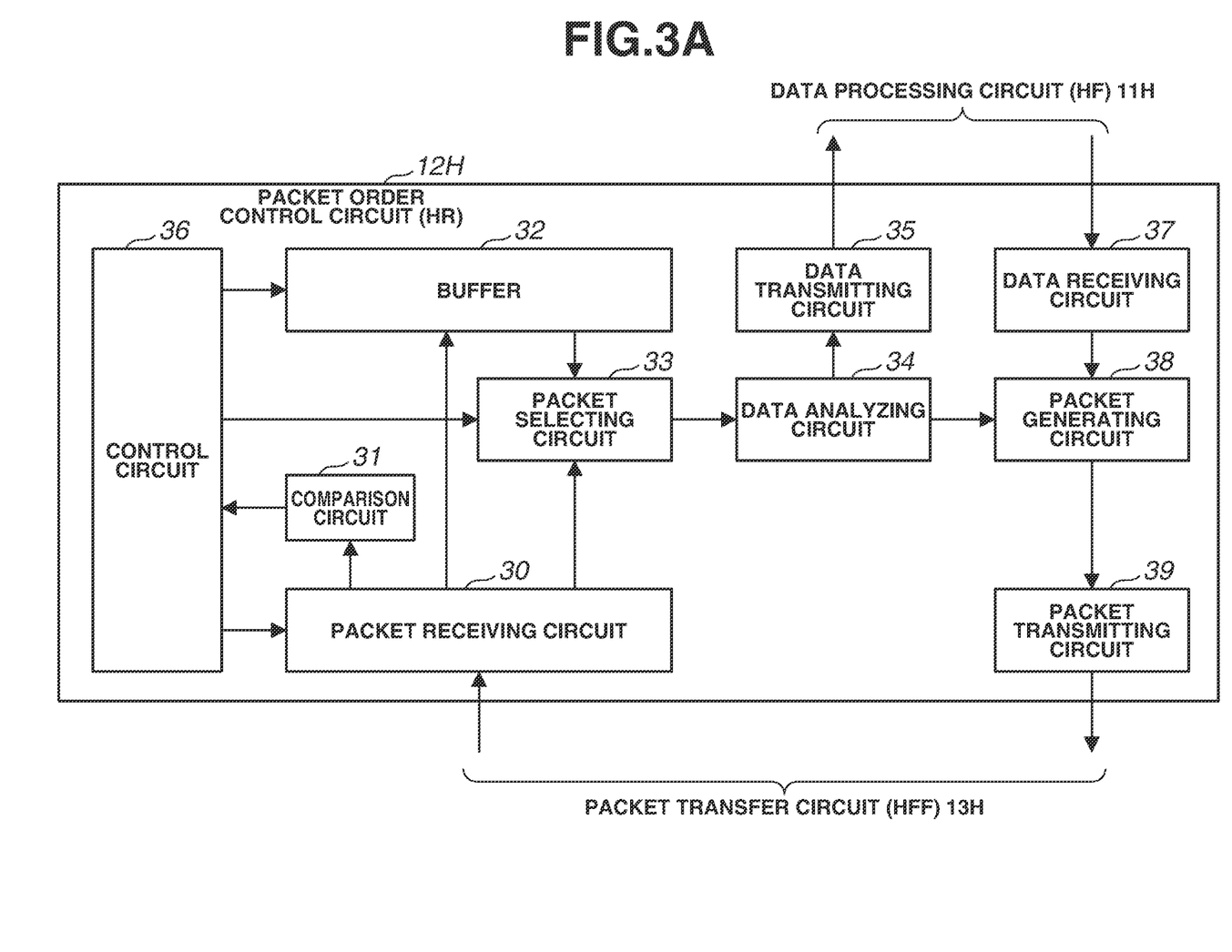
FIG. 3A is a block diagram showing the arrangement of a packet order control circuit.

As shown in FIG. 3A, the packet order control circuit 12H is implemented by hardware as a whole, and includes, as main circuits, a packet receiving circuit 30, a comparison circuit 31, a buffer 32, a packet selecting circuit 33, a data analyzing circuit 34, a data transmitting circuit 35, a control circuit 36, a data receiving circuit 37, a packet generating circuit 38, and a packet transmitting circuit 39.

Note that the packet order control unit 12S of the software processing unit 10S has the same functions as those of the packet order control circuit 12H, so a detailed explanation thereof will be omitted.

Figure 3B:
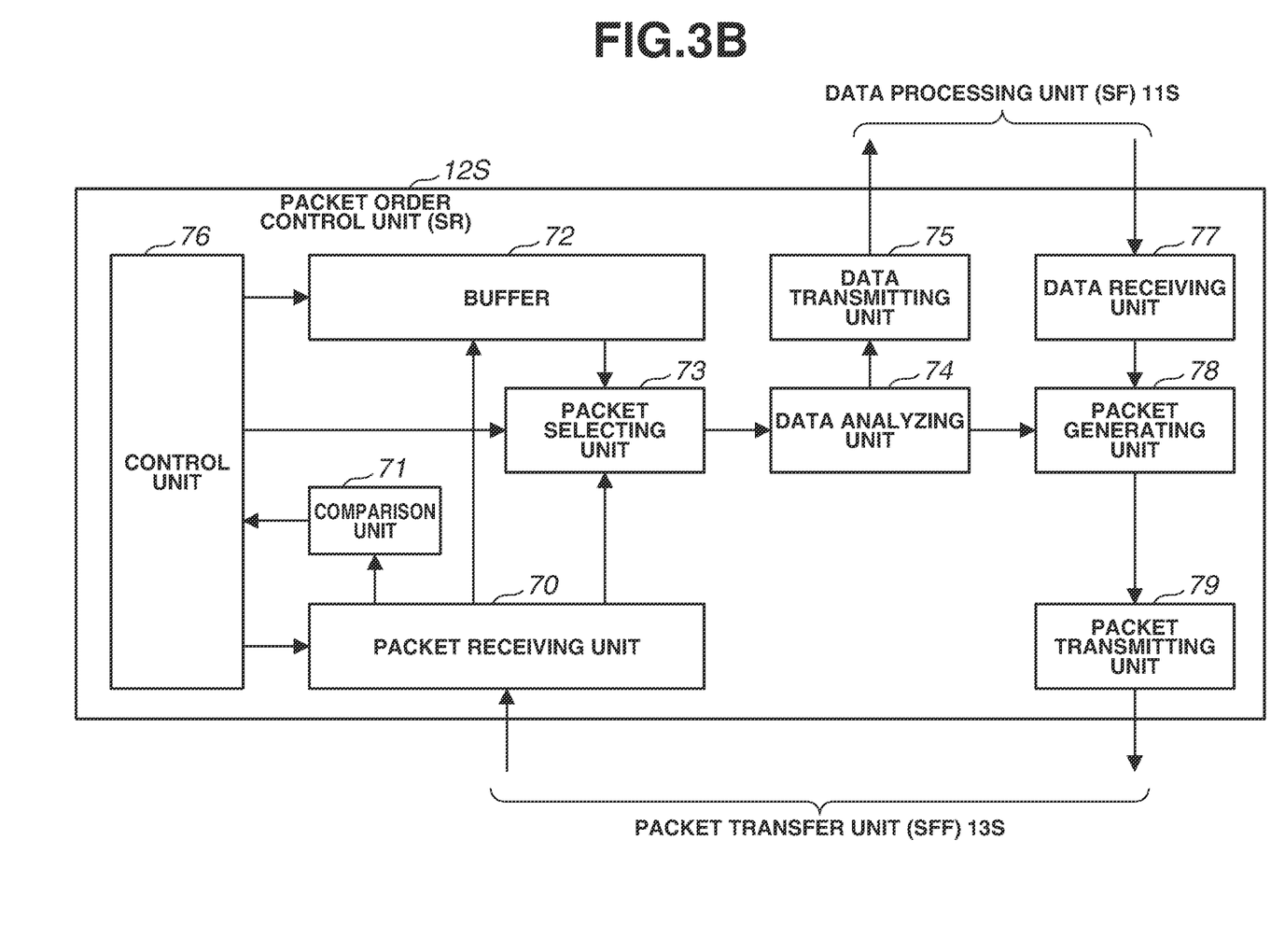
FIG. 3B is a block diagram showing the arrangement of a packet order control unit.

That is, as shown in FIG. 3B, the packet order control unit 12S is implemented by the cooperation of a CPU and a program as a whole, and includes, as main processing units, a packet receiving unit 70, a comparison unit 71, a buffer 72, a packet selecting unit 73, a data analyzing unit 74, a data transmitting unit 75, a control unit 76, a data receiving unit 77, a packet generating unit 78, and a packet transmitting unit 79. These processing units respectively correspond to the packet receiving circuit 30, the comparison circuit 31, the buffer 32, the packet selecting circuit 33, the data analyzing circuit 34, the data transmitting circuit 35, the control circuit 36, the data receiving circuit 37, the packet generating circuit 38, and the packet transmitting circuit 39 of the packet order control circuit 12H.

The packet receiving circuit 30 has a function of receiving a packet from the packet transfer circuit 13H and transferring the received packet to the comparison circuit 31, and a function of transferring a packet to the buffer 32 or the packet selecting circuit 33 in accordance with an instruction from the control circuit 36.

The buffer 32 is formed by a semiconductor memory as a whole, and used as a ring buffer for temporarily storing packets in order to control the packet processing order.

The comparison circuit 31 has a function of obtaining a packet ID allocated to an input packet from header information of the packet, comparing the packet ID with a next-selection ID held in the comparison circuit 31, and outputting a comparison result to the control circuit 36. The next-selection ID is a value to be used to determine a packet to be transmitted to the data processing circuit 11H at that time, and indicates the packet processing order.

The packet selecting circuit 33 has a function of selecting one of a packet read out from the buffer 32 and a packet input from the packet receiving circuit 30, and outputting the packet to the data analyzing circuit 34, in accordance with an instruction from the control circuit 36.

The control circuit 36 has a function of obtaining the comparison result from the comparison circuit 31, and, if the received packet is found to be a transfer target because the packet ID matches the next-selection ID, transferring the packet to the data analyzing circuit 34 by controlling the packet selecting circuit 33 without storing the packet in the buffer 32, a function of storing the packet in the buffer 32 by controlling the packet receiving circuit 30 if the packet ID does not match the next-selection ID, and a function of, if the packet ID of a packet stored in the buffer 32 matches the next-selection ID, reading out the packet from the buffer 32 and transferring the packet to the data analyzing circuit 34 by controlling the packet selecting circuit 33.

The control circuit 36 also has a function of, when storing an input packet in the buffer 32, storing the input packet in a storage position of the buffer 32, which is advanced from a reference position corresponding to the next-selectin ID by the difference between the packet ID and the next-selection ID, and a function of, when selecting a packet from the buffer 32 as a target of the transfer process, comparing the start position of packets stored in the buffer 32 with the reference position corresponding to the next-selection ID, and, if the start position matches the reference position, selecting a packet stored in the start position as a target of the transfer process.

The data analyzing circuit 34 has a function of obtaining data except header information from the input packet, and transmitting the data to the data processing circuit 11H via the data transmitting circuit 35, and a function of transferring the header information obtained from the input packet to the packet generating circuit 38.

The packet generating circuit 38 has a function of generating a packet by combining the processed data received from the data processing circuit 11H via the data receiving circuit 37, and the header information from the data analyzing circuit 34.

The packet transmitting circuit 39 has a function of transmitting the packet generated by the packet generating circuit 38 to the packet transfer circuit 13H.

A packet 40 to be used in the network system 1 uses a general Ethernet® II frame format. As indicated by a packet format shown in FIG. 4, a data portion 41 of the packet 40 includes IP header information 42, UDP header information 43, user definition header information 44, and a data portion 45. The IP header information 42 and the UDP header information 43 are standardized header information, but the user definition header information 44 is unique header information that is stored in a region corresponding to the fifth layer (a session layer), the sixth layer (a presentation layer), or the seventh layer (an application layer) in the OSI reference model, and used in processing in these layers.

Figure 4:
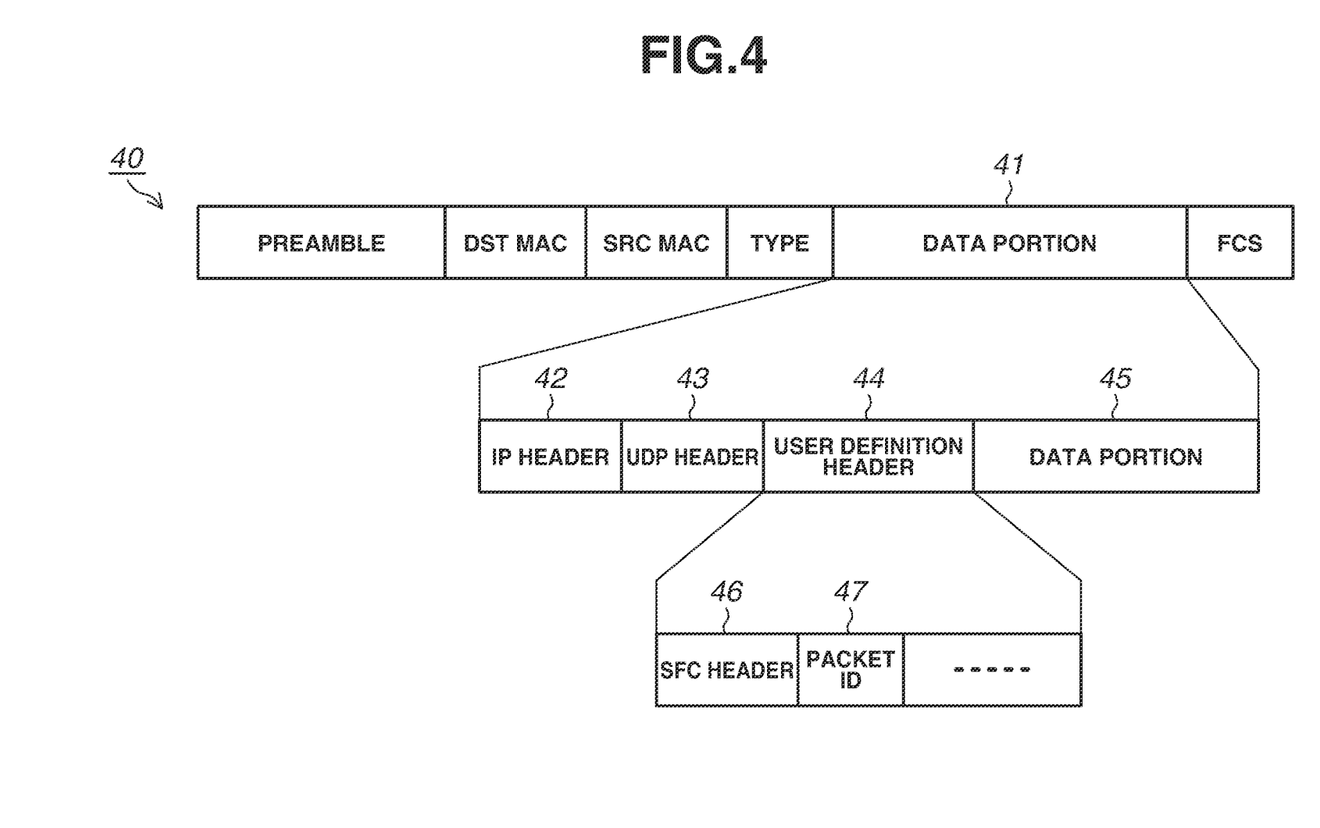
FIG. 4 is a view for explaining a packet format used in the network system.

The user definition header information 44 of the packet according to the present invention includes various kinds of unique information such as SFC header information 46 given by the SFC header information giving apparatus 22, and a packet ID 47 to be used in the packet order control circuit 12H. The packet ID 47 is a sequential value consecutive from one packet to another, and is compared with the next-selection ID indicating the packet processing order. The data portion 45 stores data to be actually used in data processing for network services in the data processing unit 11S and the data processing circuit 11H.

[Operation of This Embodiment]

The operation of the packet order control circuit 12H of the hardware processing unit 10H according to this embodiment will be explained below with reference to FIG. 5. Note that the packet order control unit 12S of the software processing unit 10S operates in the same manner as the packet order control circuit 12H to be explained below, so a detailed explanation thereof will be omitted.

Figure 5:
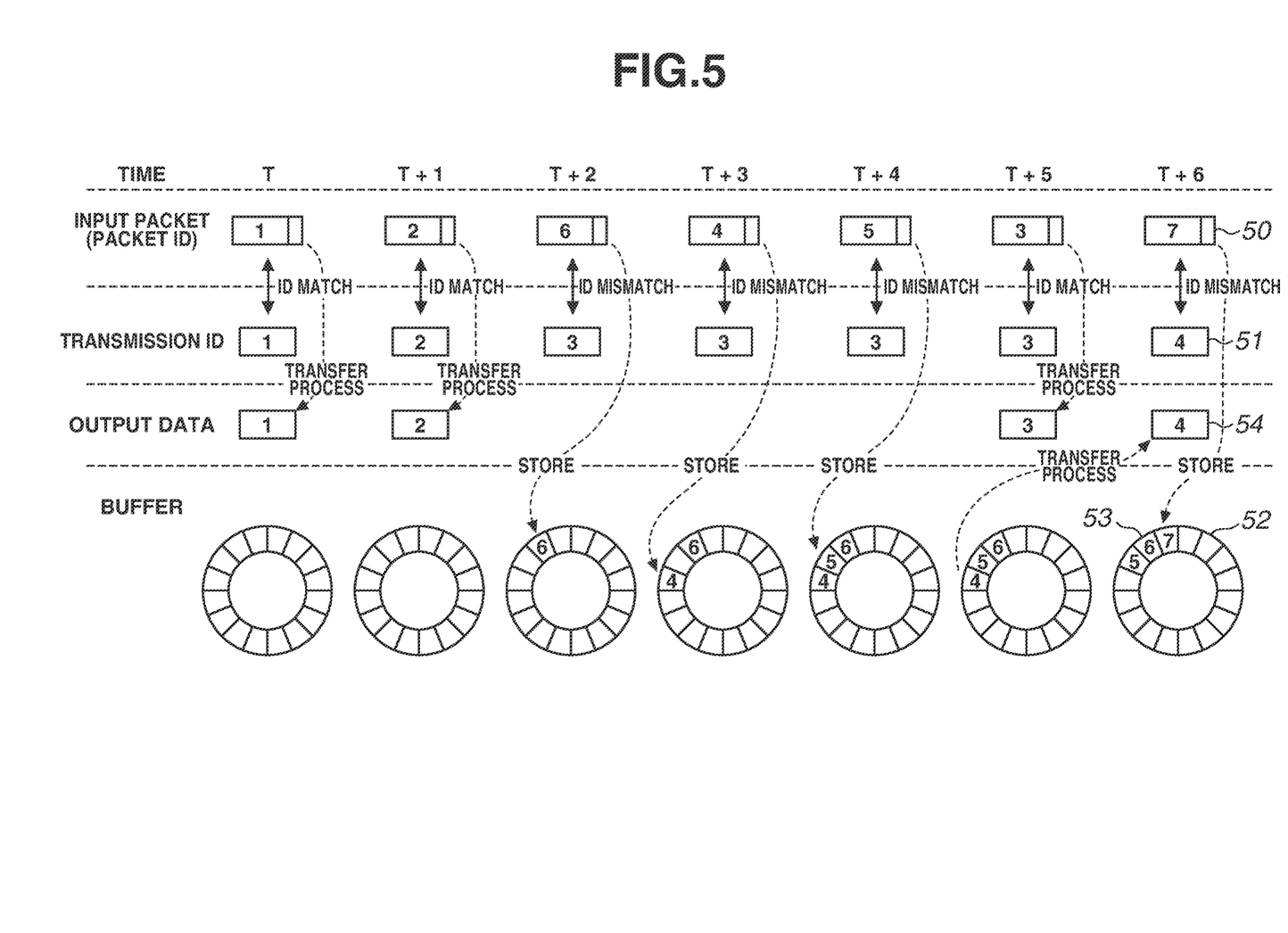
FIG. 5 is a view for explaining an operation example of the packet order control unit.

As shown in FIG. 5, at times T and T+1, the packet IDs (=1 and 2) of input packets (50) match the next-selection IDs (51) (=1 and 2) indicating the packet processing order, so the input packets are transferred as output data (54). In this case, the next-selection ID is updated to the next packet ID.

On the other hand, at times T+2 to T+4, the packets IDs (=6, 4, and 5) of input packets do not match the next-selection ID (=3), so the input packets are stored in the buffer 32 (52). A method of specifying a packet storage address will be described later.

At time T+5, the packet ID (=3) of an input packet matches the next-selection ID (=3), the input packet is transferred as output data, and the next-selection ID is updated to the next packet ID (=4).

Consequently, at time T+6, the packet ID (=4) of the packet stored in the buffer 32 matches the next-selection ID (=4), so the stored packet (53) is extracted from the buffer 32, and transferred as output data. If the next input packet (packet ID=7) arrives during the processing, this packet is not an output target and is stored in the buffer 32.

The operation of the buffer 32 according to this embodiment will be explained below with reference to FIG. 6.

Figure 6:
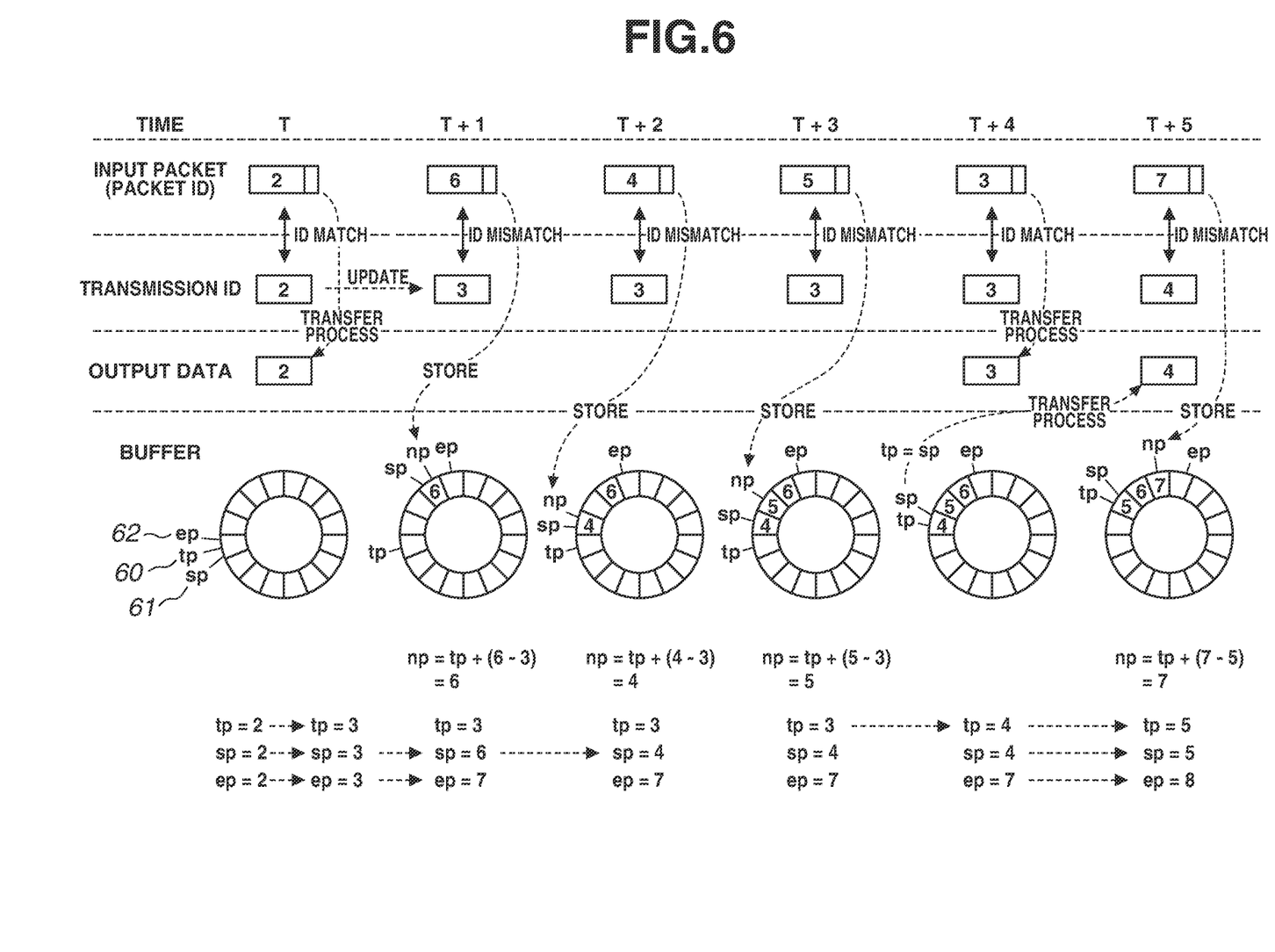
FIG. 6 is a view for explaining an operation example of a buffer.

As shown in FIG. 6, the buffer 32 is formed by a ring buffer and managed by a reference address (tp: reference position) 60, a start address (sp: start position) 61, and an end address (ep: end position) 62. sp and ep respectively indicate positions immediately after the start and end of a packet storage section, and tp is a storage position when assuming that an output target packet is stored in the buffer 32.

The ring buffer returns to the start position when the address reaches the end position, so the relationship between the values of tp, sp, and ep in the terminal end is the reverse of that in other positions. However, only "match" and "mismatch" are important between variables, so the value of each variable need only be updated based on the same rule without any problem. In the terminal end processing, therefore, it is only necessary to return to the start position when the value reaches the end position.

When adding an input packet to the buffer 32, the relative distance (=the distance from tp) between the packet ID and the next-selection ID is calculated, and the result is converted into an address in the buffer 32. Then, the packet is stored in the position of the obtained address. tp is updated in synchronism with the next-selection ID, and, when tp and sp match, a packet stored in the position of sp is extracted from the buffer 32. After that, sp is updated to the storage position of the next start packet.

At time T in FIG. 6, the buffer 32 is empty, tp, sp, and ep indicate the same position (=2), and the packet ID (=2) of an input packet matches the next-selection ID (=2) indicating the packet processing order, so the input packet is transferred as output data. In this case, sp and ep are updated (=3), and the next-selection ID and tp are updated to the next packet ID (=3).

Subsequently, at time T+1, the packet ID (=6) of an input packet does not match the next-selection ID (=3), so the input packet is stored in the buffer 32. In this case, the packet is stored in a storage position np (=6) advanced clockwise from tp (=3) along the storage address order, by the difference (=6-3=3) between the next-selection ID and the packet ID of the input packet. In this case, sp is matched with the position (=6) where the packet is stored, and ep is matched with the next storage position (=7).

Similarly, at time T+2, ID mismatch occurs, so an input packet is stored in a storage position np (=4) advanced clockwise from tp (=3) by a difference of 4−3=1. In this case, the start packet changes, so sp is matched with the position (=4) where the packet having a packet ID of 4 is stored.

At time T+3 after that, ID mismatch occurs, so an input packet is stored in a storage position np (=5) advanced clockwise from tp (=3) by a difference of 5−3=2. In this case, the start and end packets remain unchanged, so sp and ep need not be corrected.

Subsequently, at time T+4, the packet ID (=3) of an input packet matches the next-selection ID (=3), so the input packet is not stored in the buffer 32 but transferred as output data. In this case, the next-selection ID is updated to 4, and the packet storage position indicated by tp is updated to an immediately adjacent storage position (=4).

After that, at time T+5, a packet in the storage position indicated by sp (=4) matches the packet storage position (=4) indicated by tp in the buffer 32, so this packet (packet ID=4) is extracted from the buffer 32 and transferred as output data. In this case, the next-selection ID is updated to 5, and the packet storage positions indicated by tp and sp are updated to immediately adjacent storage positions (=5).

After that, the packet ID (=7) of an input packet does not match the next-selection ID (=5), so the input packet is stored in a storage position np (=7) advanced clockwise from tp (=5) by a difference of 7−5=2. In this case, ep is matched with the next storage position (=8).

The above operation makes it possible to uniquely specify the locations of packets stored in the buffer 32, so they can be transferred to the data processing circuit 11H at packet-by-packet transfer timings.

Note that it can be assumed that some packets do not arrive. In this case, a stall of the processing can be prevented by forcedly updating the next-selection ID when a predetermined time elapses or a predetermined amount of packets are stored in the buffer 32.

[Packet Receiving Process]

A packet receiving process in the packet order control circuit 12H according to this embodiment will be explained below with reference to FIG. 7.

Figure 7:
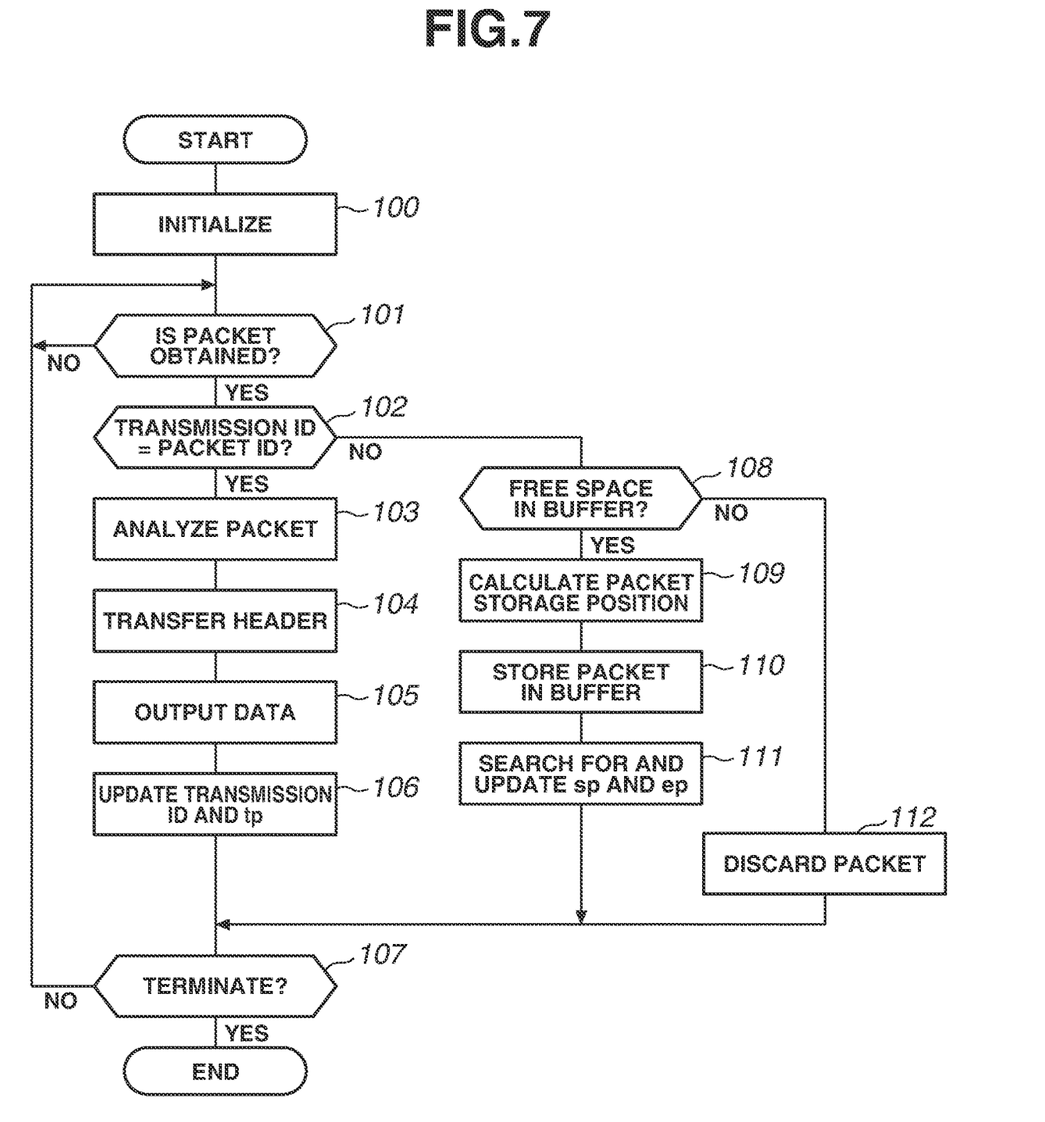
FIG. 7 is a flowchart showing a packet receiving process in the packet order control unit.

As shown in FIG. 7, the packet order control circuit 12H first initializes various preset processing parameters (step 100), and waits until a packet is received from the packet transfer circuit 13H (step 101: NO).

If a packet is received from the packet transfer circuit 13H (step 101: YES), the packet order control circuit 12H compares the packet ID of the received input packet with the next-selection ID (step 102).

If the packet ID matches the next-selection ID (step 102: YES), the packet order control circuit 12H analyzes the input packet (step 103), transfers header information of the input packet to the packet generating circuit 38 (step 104), and outputs data stored in the input packet to the data processing circuit 11H (step 105).

After that, the packet order control circuit 12H updates the next-selection ID to the next packet ID and also updates tp (step 106), and determines whether to terminate the operation based on an external control signal or the like (step 107). If it is determined to continue the packet receiving process (step 107: NO), the process returns to step 101. If it is determined to terminate the packet receiving process (step 107: YES), the series of packet receiving processes are terminated.

On the other hand, if the packet ID of the input packet does not match the next-selection ID (step 102: NO), the packet order control circuit 12H determines whether the buffer 32 has a free space (step 108).

If there is a free space (step 108: YES), the packet order control circuit 12H calculates a packet storage position in the buffer 32 by the above-described method (step 109), stores the packet in that position (step 110), performs search and update of sp and ep (step 112), and proceeds to step 107. If there is no free space (step 108: NO), the packet order control circuit 12H discards the packet (step 112), and proceeds to step 107.

[Packet Transfer Process]

A packet transfer process in the packet order control circuit 12H according to this embodiment will be explained below with reference to FIG. 8.

Figure 8:
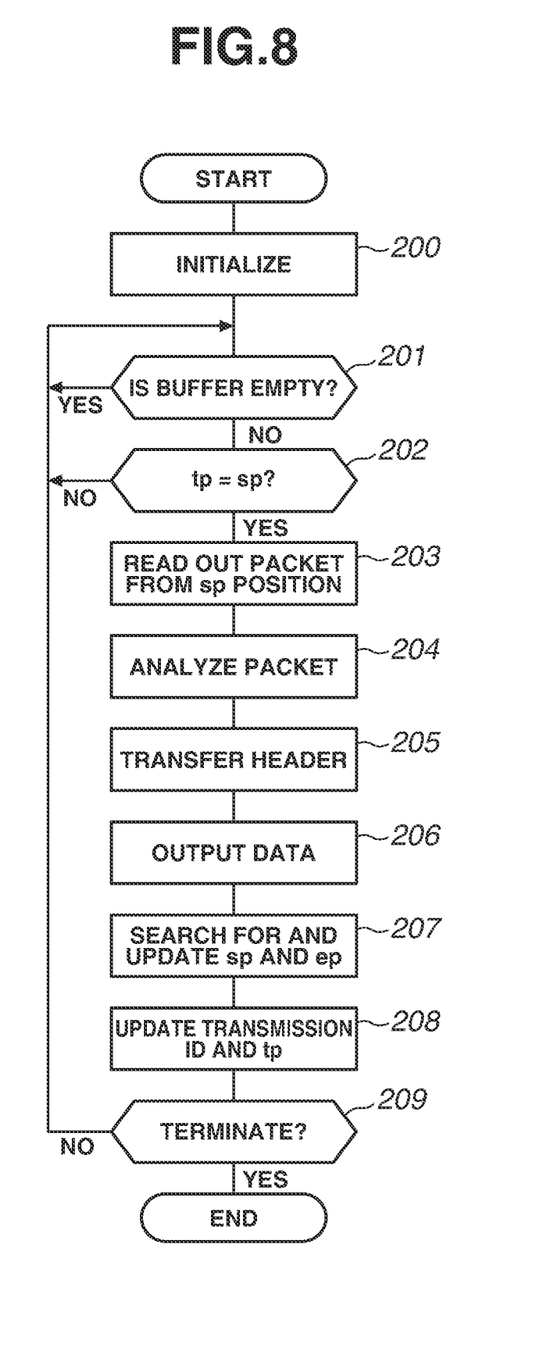
FIG. 8 is a flowchart showing a packet transfer process in the packet order control unit.

As shown in FIG. 8, the packet order control circuit 12H first initializes various preset processing parameters (step 200), and waits until the buffer 32 becomes no longer empty, that is, until a packet is stored in the buffer 32 (step 201: YES).

If any packet is stored in the buffer 32 (step 201: NO), the packet order control circuit 12H compares the packet ID of the start packet indicated by sp in the buffer 32 with the next-selection ID of a target packet indicated by tp (step 202).

If the packet ID and the next-selection ID do not match (step 202: NO), the process returns to step 201.

On the other hand, if the packet ID and the next-selection ID match (step 202: YES), the packet order control circuit 12H reads out the packet stored in the position of sp from the buffer 32 (step 203), analyzes the packet by the data analyzing circuit 34 (step 204), transfers header information of the packet to the packet generating circuit 38 (step 205), and outputs data stored in the packet to the data processing circuit 11H (step 206).

Subsequently, the packet order control circuit 12H updates sp and searches for the next start packet stored in the buffer 32 (step 207). If sp and ep match, it can be determined that no packet is stored in the buffer 32, so the packet order control circuit 12H stops the search. In addition, the packet order control circuit 12H updates the next-selection ID and tp (step 208).

After that, the packet order control circuit 12H determines whether to terminate the operation based on an external control signal or the like (step 209). If it is determined to continue the packet transfer process (step 209: NO), the process returns to step 201. If it is determined to terminate the packet transfer process (step 209: YES), the packet order control circuit 12H terminates the series of packet transfer processes.

By the above processing, the packet order control circuit 12H can guarantee the packet order, and transfer data in an appropriate order to the data processing circuit 11H.

[Operation Example of This Embodiment]

An operation example of this embodiment will be explained below with reference to FIG. 9.

In UDP communication often used in real-time communication of image data and the like, no means for specifying the packet order is installed. Accordingly, the packet order sometimes changes on a communication path. When reproducing the original image data by assembling the received packets, the packet order is important to improve the processing efficiency.

By applying this embodiment, therefore, a header (the user definition header 44 shown in FIG. 4) that defines information related to an application is added to a position higher than the UDP header, and used in packet order control.

Figure 9:
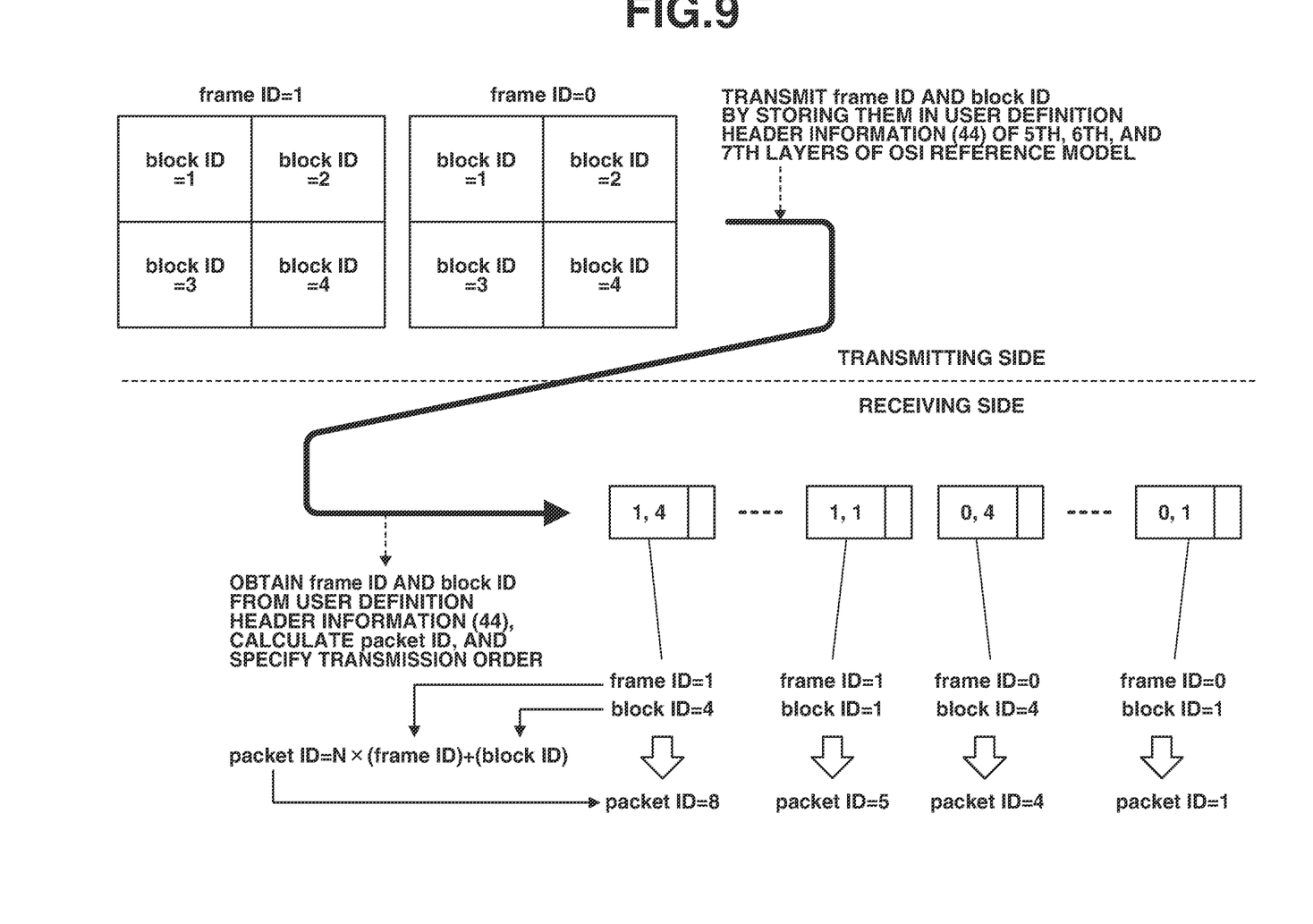
FIG. 9 is a view for explaining an operation example of transmitting two images in succession.

FIG. 9 shows an example in which two images are successively transmitted. In this example, each image (frame ID=0 or 1) is divided into four blocks (block IDs=1 to 4), and these blocks are transmitted in order as packets. In this case, the frame ID and the block ID are held in the user definition header 44 of each packet. Consequently, the data processing unit 11H can specify the image to which each packet belongs and the coordinates of the packet, and discriminate the packet transmission order.

For example, letting N be the number of blocks contained in one image, that is, the block division number, a packet ID to which an integral value is sequentially allocated as the packet transmission order is calculated by:

$$\text{packet ID} = N \times (\text{frame ID}) + (\text{block ID})$$

In the example shown in FIG. 9, each image contains four blocks, so N=4. Accordingly, the packet ID of a packet that is transmitted first and contains data of frame ID=0 and block ID=1 is calculated as 4×0+1=1. Also, the ID of a packet containing data of frame ID=1 and block ID=1 is calculated as 4×1+1=5.

By using the packet IDs calculated as described above, therefore, the packet order control unit 12H can correctly guarantee the packet order.

[Effects of This Embodiment]

In this embodiment as described above, the buffer 32 for temporarily storing a packet is installed in the packet order control circuit 12H, and the comparison circuit 31 compares the packet ID of an input packet with the next-selection ID indicating the packet ID of a packet to be selected next in accordance with the order. If the comparison result indicates that the packet ID and the next-selection ID match, the control circuit 36 selects the packet as a target of the transfer process. If the packet ID and the next-selection ID do not match, the control circuit 36 stores the packet in a storage position corresponding to the packet ID. If a packet having the packet ID corresponding to the next-selection ID is stored in the buffer 32, the control circuit 36 selects this packet as a target of the transfer process.

More specifically, when storing a packet in the buffer 32, the control circuit 36 stores the packet in a storage position advanced from the reference position by the difference between the packet ID and the next-selection ID. When selecting a packet as a target of the transfer process from the buffer 32, the control circuit 36 compares the start position of packets stored in the buffer 32 with the reference position corresponding to the next-selection ID. If the start position and the reference position match, the control circuit 36 selects a packet stored in the start position as a target of the transfer process.

In accordance with the order of packet IDs, therefore, whether to select a packet input to the packet order control circuit 12H as a target of transfer to the data processing circuit 11H or temporarily store the packet in the buffer 32 is accurately determined based on the packet ID and the next-selection ID. Accordingly, if the packet is selected as a transfer target, the packet can be transferred to the data processing circuit 11H without being stored in the buffer 32. In addition, the storage location of a packet stored in the buffer 32 can uniquely be specified based on the packet ID, so a packet corresponding to the next-selection ID can immediately be selected from the buffer 32.

By installing one buffer 32, therefore, sequentially input packets can sequentially be selected in accordance with the order of packet IDs contained in header information of these packets. Accordingly, even in hardware implementation for which memory resources are strictly restricted, the packet processing order can be guaranteed with minimum memory resources. Consequently, even a network service requiring data processing having a large calculation amount and unsuitable for software processing can be implemented by hardware implementation for which memory resources are strictly restricted.

[Extension of This Embodiment]

The present invention has been explained by referring to the embodiment, but the present invention is not limited to the abovementioned embodiment. Various changes that can be understood by those skilled in the art within the scope of the present invention can be made on the arrangements and details of the invention.

EXPLANATION OF THE REFERENCE NUMERALS AND SIGNS

1 . . . network system, 10 . . . data processing apparatus, 10S . . . software processing unit, 10H . . . hardware processing unit, 11S . . . data processing unit (SF), 11H . . . data processing circuit (HF), 12S . . . packet order control unit (SR), 12H . . . packet order control circuit (HR), 13S . . . packet transfer unit (SFF), 13H . . . packet transfer circuit (HFF), 14S . . . transfer control unit, 14H . . . transfer control circuit, 15 . . . input/output circuit, 20 . . . control apparatus, 21 . . . user terminal, 22 . . . SFC header information giving apparatus (CL), 30 . . . packet receiving circuit, 31 . . . comparison circuit, 32 . . . buffer, 33 . . . packet selecting circuit, 34 . . . data analyzing circuit, 35 . . . data transmitting circuit, 36 . . . control circuit, 37 . . . data receiving circuit, 38 . . . packet generating circuit, 39 . . . packet transmitting circuit, 40 . . . packet, 41 . . . data portion, 42 . . . IP header information, 43 . . . UDP header information, 44 . . . user definition header information, 45 . . . data portion, 46 . . . SFC header information, 47 . . . packet ID, 70 . . . packet receiving unit, 71, comparison unit, 72 . . . buffer, 73 . . . packet selecting unit, 74 . . . data analyzing unit, 75 . . . data transmitting unit, 76 . . . control unit, 77 . . . data receiving unit, 78 . . . packet generating unit, 79 . . . packet transmitting unit, L . . . communication link

The invention claimed is:

1. A data processing apparatus comprising:
one or a plurality of input/output circuits configured to perform data communication via a communication link; and
a hardware processing unit configured to implement, by hardware, data processing for configuring a network service to be used by a user,
wherein the hardware processing unit comprises:
a data processing circuit configured to execute the data processing based on input data;
a packet transfer circuit configured to receive a packet containing data for executing the data processing, and transmit a packet containing data obtained by the data processing; and
a packet order control circuit configured to sequentially select packets received and input by the packet transfer circuit, in accordance with an order of packet IDs contained in header information of the packets, and perform a transfer process of transferring data contained in the selected packets to the data processing circuit, the packet order control circuit comprises:
a buffer configured to temporarily store a packet;
a comparison circuit configured to compare a packet ID of an input packet with a next-selection ID indicating a packet ID of a packet to be selected next in accordance with the order; and
a control circuit configured to store the input packet in a storage position of the buffer, which corresponds to the packet ID, if a comparison result of the comparison circuit indicates that the packet ID and the next-selection ID do not match, and select the input packet as a target of the transfer process without storing the packet in the buffer, if the packet ID and the next-selection ID match,
wherein, if the next-selection ID matches a packet ID of a packet stored in the buffer, the control circuit selects the packet as a target of the transfer process.

2. The data processing apparatus according to claim 1, wherein, when storing the input packet in the buffer, the control circuit stores the input packet in a storage position of the buffer, which is advanced from a reference position corresponding to the next-selection ID by a difference between the packet ID and the next-selection ID.

3. The data processing apparatus according to claim 2, wherein, when selecting a packet from the buffer as a target of the transfer process, the control circuit compares a start position of each packet stored in the buffer with a reference position corresponding to the next-selection ID, and, if the start position and the reference position match, selects the packet stored in the start position as the target of the transfer process.

4. The data processing apparatus according to claim 2, wherein the packet ID is stored in a region of the packet corresponding to a fifth layer, a sixth layer, or a seventh layer in an OSI reference model.

5. A network system comprising a plurality of data processing apparatuses distributed on a network, and providing various network services for a user by allowing the data processing apparatuses to cooperate, wherein at least one or a plurality of data processing apparatuses comprise a data processing apparatus cited in claim 2, which implements data processing for configuring the network services by hardware.

6. The data processing apparatus according to claim 1, wherein, when selecting a packet from the buffer as a target of the transfer process, the control circuit compares a start position of each packet stored in the buffer with a reference position corresponding to the next-selection ID, and, if the start position and the reference position match, selects the packet stored in the start position as the target of the transfer process.

7. The data processing apparatus according to claim 6, wherein the packet ID is stored in a region of the packet corresponding to a fifth layer, a sixth layer, or a seventh layer in an OSI reference model.

8. A network system comprising a plurality of data processing apparatuses distributed on a network, and providing various network services for a user by allowing the data processing apparatuses to cooperate, wherein at least one or a plurality of data processing apparatuses comprise a data processing apparatus cited in claim 6, which implements data processing for configuring the network services by hardware.

9. The data processing apparatus according to claim 1, wherein the packet ID is stored in a region of the packet corresponding to a fifth layer, a sixth layer, or a seventh layer in an OSI reference model.

10. A network system comprising a plurality of data processing apparatuses distributed on a network, and providing various network services for a user by allowing the data processing apparatuses to cooperate, wherein at least one or a plurality of data processing apparatuses comprise a data processing apparatus cited in claim 9, which implements data processing for configuring the network services by hardware.

11. A network system comprising a plurality of data processing apparatuses distributed on a network, and providing various network services for a user by allowing the data processing apparatuses to cooperate, wherein at least one or a plurality of data processing apparatuses comprise a data processing apparatus cited in claim 1, which implements data processing for configuring the network services by hardware.

12. A packet order control circuit comprising:
a buffer configured to temporarily store a packet to be subjected to preset processing;
a comparison circuit configured to compare a packet ID contained in an input packet with a next-selection ID indicating a packet ID of a packet to be selected next in accordance with an order of packet IDs; and
a control circuit configured to store the input packet in a storage position of the buffer, which corresponds to the packet ID, if a comparison result of the comparison circuit indicates that the packet ID and the next-selection ID do not match, and select the input packet as a target of the processing without storing the packet in the buffer, if the packet ID and the next-selection ID match,
wherein if the next-selection ID matches a packet ID of a packet stored in the buffer, the control circuit selects the packet as the target of the processing.

13. A data processing method to be used in a data processing apparatus comprising one or a plurality of input/output circuits configured to perform data communication via a communication link, and a hardware processing unit configured to implement, by hardware, data processing for configuring a network service to be used by a user, the data processing method comprising:
a data processing step of causing a data processing circuit to execute the data processing based on input data;
a packet transfer step of causing a packet transfer circuit to receive a packet containing data for executing the data processing, and transmit a packet containing data obtained by the data processing; and
a packet order control step of causing a packet order control circuit including a buffer configured to temporarily store a packet to sequentially select packets received and input by the packet transfer circuit, in accordance with an order of packet IDs contained in header information of the packets, and perform a transfer process of transferring data contained in the selected packets to the data processing circuit,
wherein the packet order control step comprises:
a comparison step of causing a comparison circuit to compare a packet ID of an input packet with a next-selection ID indicating a packet ID of a packet to be selected next in accordance with the order; and
a control step of causing a control circuit to store the input packet in a storage position of the buffer, which corresponds to the packet ID, if a comparison result of the comparison circuit indicates that the packet ID and the next-selection ID do not match, and select the input packet as a target of the transfer process without storing the packet in the buffer, if the packet ID and the next-selection ID match, and
if the next-selection ID matches a packet ID of a packet stored in the buffer, the control step selects the packet as a target of the transfer process.

14. The data processing method according to claim 13, wherein, when storing the input packet in the buffer, the control step stores the input packet in a storage position of the buffer, which is advanced from a reference position corresponding to the next-selection ID by a difference between the packet ID and the next-selection ID.

15. The data processing method according to claim 14, wherein, when selecting a packet from the buffer as a target of the transfer process, the control step compares a start position of each packet stored in the buffer with a reference position corresponding to the next-selection ID, and, if the start position and the reference position match, selects the packet stored in the start position as the target of the transfer process.

16. The data processing method according to claim 13, wherein, when selecting a packet from the buffer as a target of the transfer process, the control step compares a start position of each packet stored in the buffer with a reference position corresponding to the next-selection ID, and, if the start position and the reference position match, selects the packet stored in the start position as the target of the transfer process.

* * * * *